Dec. 28, 1943.    R. P. SCHERER    2,337,935
APPARATUS FOR FORMING SHEETS OF PLASTIC SUBSTANCES
Filed March 28, 1941    3 Sheets-Sheet 1
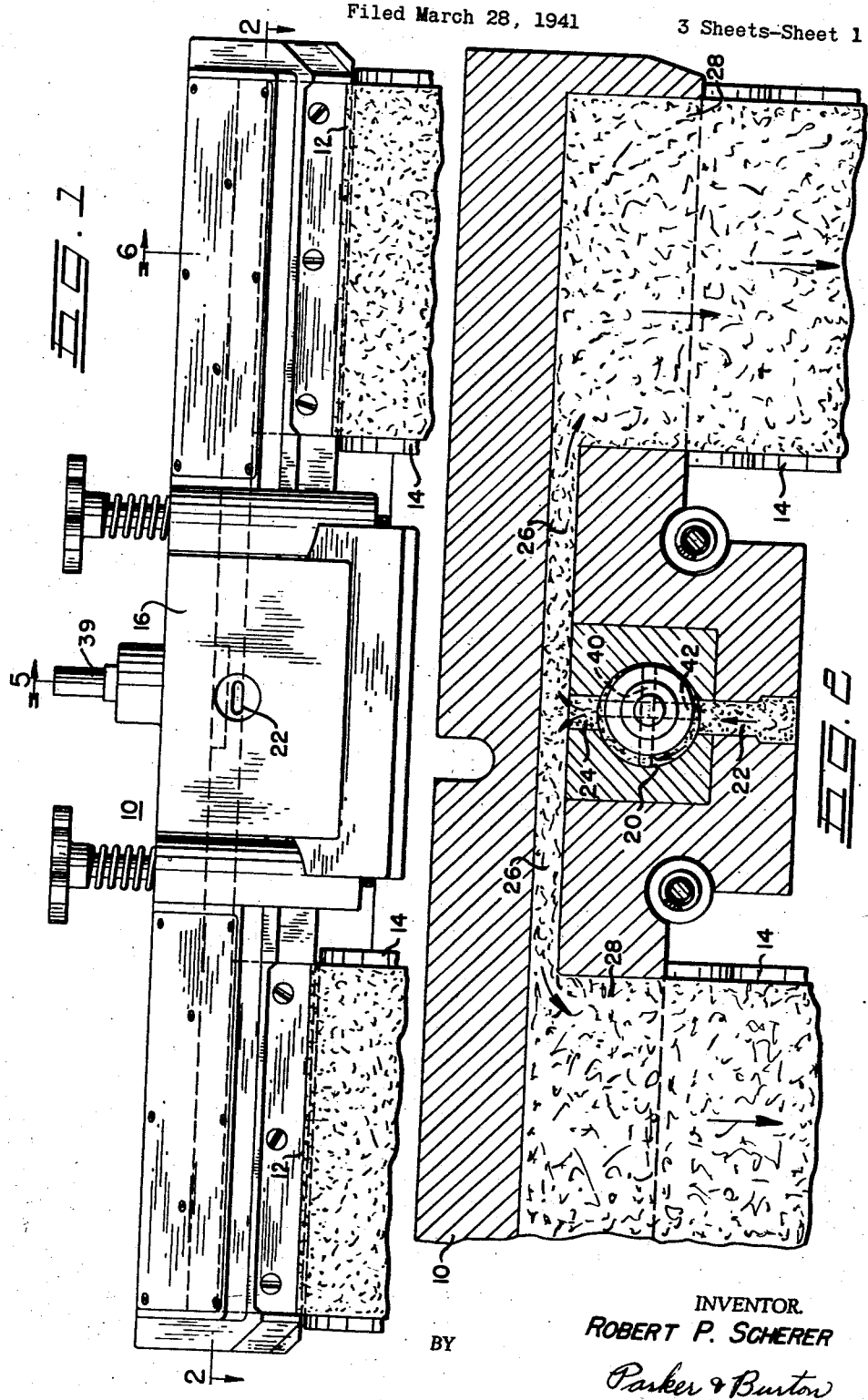
INVENTOR.
ROBERT P. SCHERER
BY Parker & Burton
ATTORNEYS.

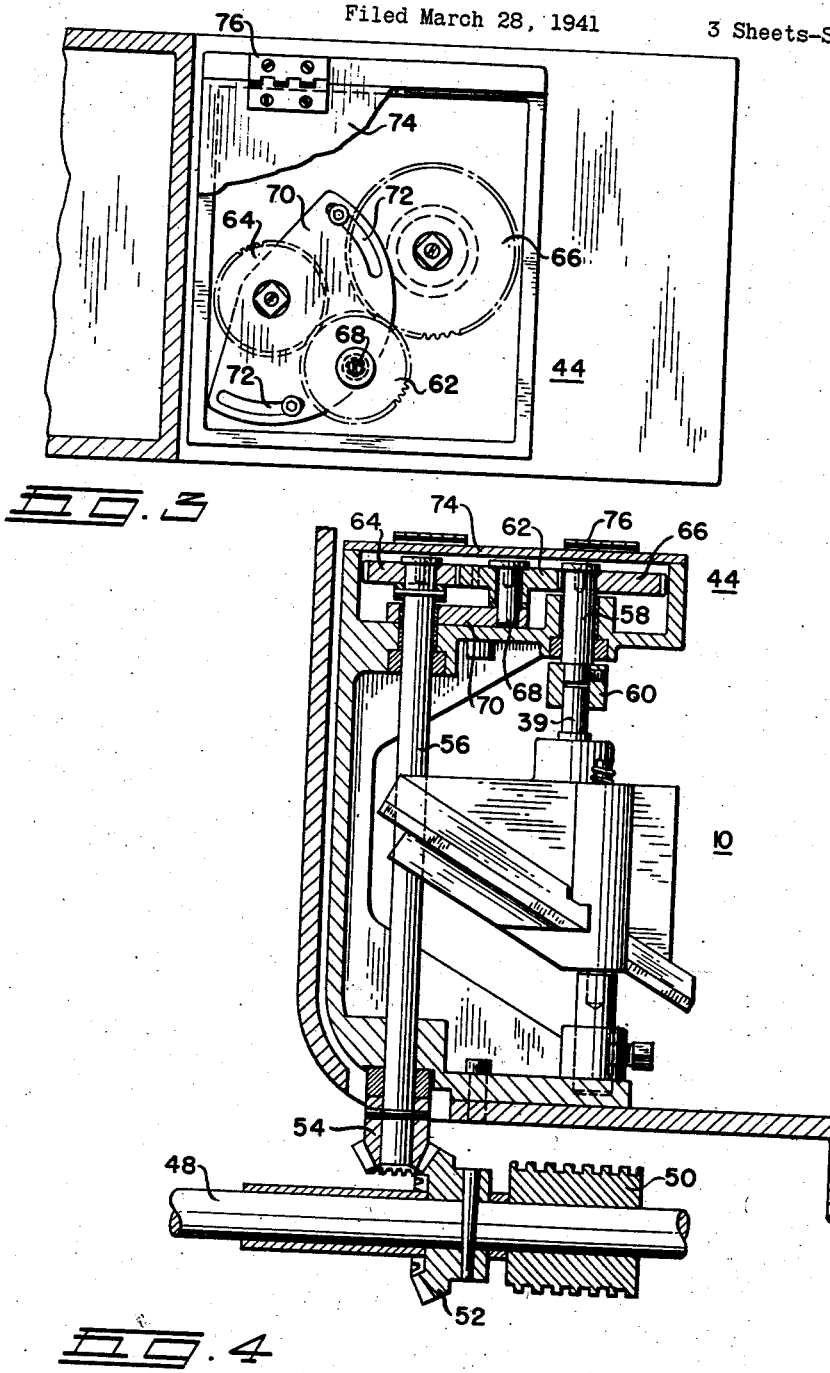

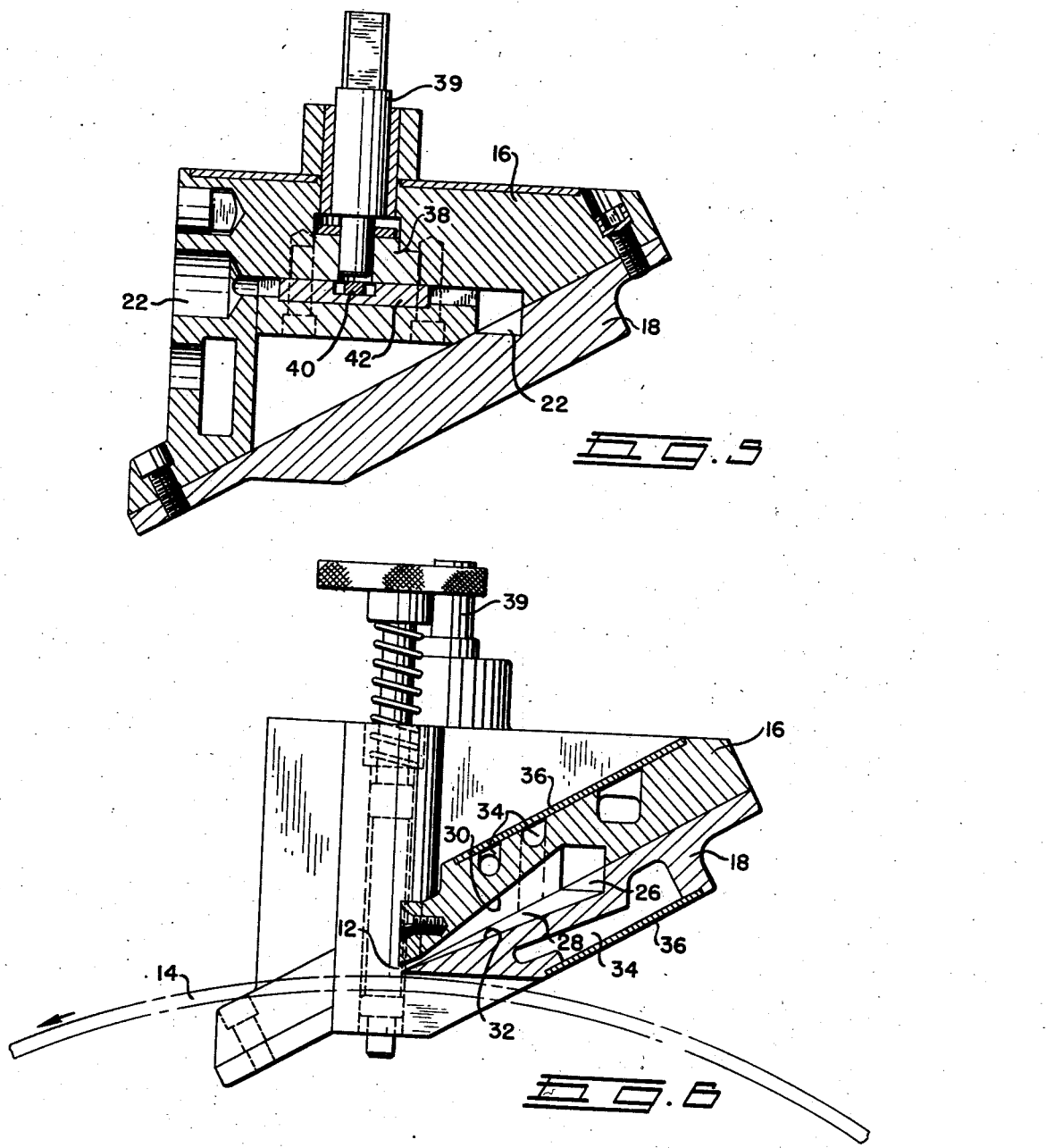

Patented Dec. 28, 1943

2,337,935

UNITED STATES PATENT OFFICE 2,337,935

APPARATUS FOR FORMING SHEETS OF PLASTIC SUBSTANCES

Robert P. Scherer, Detroit, Mich.

Application March 28, 1941, Serial No. 385,752

1 Claim. (Cl. 18—15)

This invention relates to a novel apparatus for shaping material in plastic condition into elongated articles of ribbon or sheet formation.

Heretofore it has been the practice to allow materials in a plastic state, which it is desired to form into elongated articles, to flow by force of gravity through regulated openings or gates which impart the desired shape to the article. Considerable heat was necessary for those substances which at normal temperatures are relatively solid in order to bring them to the proper fluid state for movement out through the gate. Large and relatively complicated compartments or boxes were necessary to contain the plastic substance while it was heated to the proper state for flowing out of the restricted opening. The large size of the receptacle or box and the provision for heating the same required a comparatively expensive structure for shaping sheet-like articles of this nature.

It is an important object of this invention to provide a novel apparatus for forming elongated articles of ribbon or sheet-like formation which reduces the size of the receptacle or box containing the substance to be shaped and the heating means necessary for bringing it to the proper fluid state, and which more accurately controls the thickness of the material discharged through the regulated openings. It is another important object of this invention to provide new apparatus for forming plastic substances into sheet formation by metering the material through heated chambers and out through regulated openings. A novel feature is the provision of means which so regulates the advance of the plastic substances through the chamber that it is caused to be discharged from a narrow slit-like opening at a rate of speed which bears a definite relation to the thickness of the sheet material to be formed. The continuously discharging band of plastic material is flowed upon a moving surface which in the illustrated embodiment of the invention is the periphery of a constant rotating drum.

Another object of this invention is to provide an improved apparatus for forming bands of capsule shell forming material for use on capsulating machines such as the type illustrated in my Patent No. 1,970,396. The material generally used for the forming of capsule shells is a gelatinous substance which at ordinary temperatures is relatively solid but at higher temperatures becomes plastic and flowable. The present invention is particularly adapted for the formation of the gelatinous substances into bands of regulated thicknesses. It is possible as a result of this invention to control the thickness of the gelatinous bands by controlling the volume of fluid band-forming material supplied to the orifices.

Various other objects, advantages and meritorious features of this invention will become more fully apparent from the following specification, appended claims and accompanying drawings, wherein:

Figure 1 is a side elevation of an apparatus constructed in accordance with this invention and associated with a pair of spaced casting drums of the type employed upon the capsulating machine illustrated in my Patent No. 1,970,-396.

Fig. 2 is a horizontal sectional view of the structure along lines 2—2 of Fig. 1, Fig. 3 is a top view of the speed change mechanism for regulating the operation of the metering pump, Fig. 4 is a view in elevation partially in section showing the drive through the speed change mechanism for operating the metering pump, Fig. 5 is a vertical sectional view through the structure along lines 5—5 of Fig. 1, and Fig. 6 is a vertical sectional view through one end portion of the structure along line 6—6 of Fig. 1.

Heretofore, as explained, the substance to be formed into narrow ribbons or thin sheets was first contained in a receptacle or box and allowed to flow by gravity through constricted openings in the form of slots which governed the thickness of the ribbon or sheet produced. In place of a receptacle or box of this character from which material was allowed to flow by gravity, the present invention contemplates the use of a metering pump to supply the material to a closed, inelastic chamber capable of confining the plastic material under any reasonable pressure and at a reasonable rate of movement. The chamber would have one or more orifices in the form of narrow slits from which the material is forced in thin bands or sheets. Disposed below the opening is a uniformly moving surface which picks up the discharged material and carries it until the band has taken a set sufficient for it to be removed and used. An important novel feature of the invention is the provision of means for supplying material to the chamber at uniform rate without regard to the pressure required to cause it to flow from the orifices. The quantity of material discharged may be varied in a novel way to vary the thickness of the material discharged from the slit-like orifices.

As previously described, the invention is particularly adapted for the formation of gelatin bands on capsulating machines of the type such as that illustrated in my Patent No. 1,970,396. The invention will be described in connection with such a capsulating machine but it is understood that the principles of this invention are applicable to other types of apparatus and processes for forming different kinds of articles.

Referring to the drawings, an elongated structure or unit 10 is provided having a closed chamber therein in which the plastic or gelatinous material is confined. The structure or unit may have one or more discharge orifices, one for a single drum, or two such as that in the illustrated embodiment of the invention for two drums. The orifices are in the form of slots, either long or short depending on the width of the band or sheet of plastic material to be produced. In the embodiment of the invention illustrated in the drawings, the structure 10 extends across the top of two spaced drums and is provided with two discharge orifices 12—12 for flowing the plastic material upon the peripheries of two casting drums 14—14.

The unit 10 comprises a cast top member 16 and a cast bottom member 18 which when properly assembled together as indicated in Figs. 5 and 6 form a hollow interior divided into several chambers and passages through which plastic material and a heating fluid are separately conducted. Referring to Fig. 2, a circular pump chamber 20 is located substantially in the center of the unit. It has an intake opening 22 and a discharge outlet 24. The former receives the plastic material from a source not shown. The latter is divided into two branch passages 26—26 leading away from one another toward chambers 28—28 in the opposite end sections of the structure. Chambers 28 are inclined downwardly from the passages 26 as shown in Fig. 6, and each tapers to a narrow width between converging top and bottom walls 30 and 32. The converging walls 30 and 32 do not meet at their lower ends but are spaced from one another to form the discharge slots 12 previously described. The drums are rotated in a direction of the arrows indicated in Fig. 6 to carry away the gelatinous material deposited thereon. The drums have a perimeter of such a length and are rotated at such a speed that when the gelatinous material spread thereon is removed at another point it is in proper condition for use in the capsulating machine or for any other purpose for which it is intended.

In order to give the plastic material the proper fluidity, the top and bottom members 16 and 18 of the structure 10 are cast with passages 34 through which heated fluid such as hot water may be circulated to raise the temperature of the gelatinous material. The passages 34 are formed by casting recesses in the outer faces of the members 16 and 18 and closing the recesses by flat plates 36 as shown in Fig. 6.

As previously mentioned, novel means is provided for feeding or metering the plastic material through the structure and causing it to flow out of the orifices 12—12 at the desired thickness and speed. This means is preferably mounted in the structure in order that it may act directly on the contents of the chamber. In the illustrated embodiment of the invention this novel means comprises a metering pump of the vane or paddle type comprising a rotating member 38 disposed above the chamber 20 to which is connected a vertical driving shaft 39. Member 38 carries radially extending vanes 40 and 42 capable of slidable movement radially as they revolve around in the chamber. These vanes abut the circular wall of the chamber and due to their eccentric mounting are forced inwardly and outwardly relative to the member 38 as the latter rotates. When the pump is operated the vanes act as paddles forcing the gelatinous material in a relatively even flow from the chamber 20 into passage 26—26 displacing the material at an even rate toward the discharge orifices 12—12.

The pump mechanism is driven by shaft mechanism from a power source such as an independent electric motor disposed above the structure, or by operating connections with the power mechanism of the capsulating machine with which the unit is associated. Between the power source and the pump is speed change mechanism generally indicated at 44 in Figs. 1, 3 and 4. In the illustrated embodiment of the invention, the power for operating the metering pump is taken from the operating mechanism of the capsulating machine and preferably from the drum driving means since this is located conveniently near by. The driving shaft for the drums is indicated at 48. It carries a worm gear 50 which is engaged with a gear wheel (not shown) fixed to the common shaft upon which the two drums 14—14 are mounted. Through bevel gear wheels 52 and 54 a vertical shaft 56 is driven. The latter shaft extends upwardly into the speed change unit 44. Depending from the unit 44 is a vertical shaft 58 which is connected through a removable collar 60 with the shaft 39 of the metering pump. Between the two shafts 56 and 58 is an idler gear 62 meshing with gear wheel 64 on shaft 56 and gear wheel 66 on shaft 58 and operatively connecting the two shafts together. The idler gear wheel 62 is mounted on a stud shaft 68 which is carried on a flat plate 70 swingable about shaft 56 as a pivotal axis. Accurate slots 72 (Fig. 3) and pins therethrough limit the swingable movement of the plate. By virtue of the assembly it is possible to substitute different sizes of gear wheels 66 to vary the drive connection between shaft 56 and 58. The plate 70 is swingable about its pivotal center to bring the idler gear into proper relation with various size gear wheels 66 on shaft 58. To permit access to the mechanism 44, a cover plate 74 is hinged at 76 to the top side of the unit.

As previously described, it is the primary object of this invention to provide a novel form of metering device which is capable of varying the thickness of the plastic band or sheet material produced by varying the quantity of material displaced or fed toward the discharge orifices. In the embodiment of the invention illustrated herein, the gear change mechanism 44 may be altered to vary the feed rate at which this metering pump is operated. It is preferred to operate the metering pump at a rate of delivery that causes the band material to discharge from the orifices 12 on to the drum peripheries at substantially the same speed as the peripheral speed of the drum. It is possible, however, to vary the thickness of material deposited on the drum by making the rate of discharge differ from the drum peripheral speed. If the rate of discharge of the material from the discharge orifices is less than the peripheral speed of the drums, the bands will be spread in a relatively thin condition on the drums.

If the material discharges from the orifices at a greater rate of speed than that of the surface speed of the drum, the discharge material will pile up on the drum and result in a band of greater thickness.

What I claim:

A capsulating machine including, in combination, a pair of drums mounted on a common driving shaft, means for rotating the drums, a unit extending across the top of said drums close to the peripheries thereof and provided interiorly with a chamber for containing thermoplastic capsule shell forming material, said chamber extending substantially the length of the unit and provided over each drum with converging top and bottom walls terminating short of each other to form narrow horizontal discharge openings extending across the top of the drums, said unit also provided interiorly with passages through which heating fluid may be conducted to make the capsule shell forming material plastic, an inlet to said chamber through which capsule shell forming material may be fed, a metering pump in said unit between said inlet and said chamber adapted to continuously feed capsule shell forming material into the chamber and displace that within said chamber toward said discharge openings, means for regulating the speed of operation of said metering pump, and power take-off means extending from said drum rotating means to said metering pump to operate the latter at the time the drums are rotated.

ROBERT P. SCHERER.